US012673471B2

(12) United States Patent
Shechtman et al.

(10) Patent No.: US 12,673,471 B2
(45) Date of Patent: Jul. 7, 2026

(54) OPTICAL ELEMENT AND METHOD OF FABRICATING THE SAME

(71) Applicant: Technion Research & Development Foundation Limited, Haifa (IL)

(72) Inventors: Yoav Shechtman, Haifa (IL); Reut Orange-Kedem, Haifa (IL)

(73) Assignee: Technion Research & Development Foundation Limited, Haifa (IL)

( * ) Notice: Subject to any disclaimer, the term of this patent is extended or adjusted under 35 U.S.C. 154(b) by 509 days.

(21) Appl. No.: 18/095,613

(22) Filed: Jan. 11, 2023

(65) Prior Publication Data

US 2023/0219312 A1        Jul. 13, 2023

Related U.S. Application Data

(60) Provisional application No. 63/298,288, filed on Jan. 11, 2022.

(51) Int. Cl.
| | |
|---|---|
| *B29D 11/00* | (2006.01) |
| *B29C 33/38* | (2006.01) |
| *B33Y 80/00* | (2015.01) |
| *G02B 27/42* | (2006.01) |

(52) U.S. Cl.
CPC .... B29D 11/00769 (2013.01); B29C 33/3842 (2013.01); B33Y 80/00 (2014.12); G02B 27/42 (2013.01)

(58) Field of Classification Search
CPC .............. B29D 11/00769; B33Y 80/00; B29C 33/3842; G02B 27/42
See application file for complete search history.

(56) References Cited

U.S. PATENT DOCUMENTS

| | | | |
|---|---|---|---|
| 5,734,502 A | 3/1998 | Ebstein | |
| 2007/0201011 A1 | 8/2007 | Kokubun | |
| 2008/0204880 A1 | 8/2008 | Hendriks | |
| 2022/0019007 A1* | 1/2022 | Schmidt | G09F 9/00 |

* cited by examiner

*Primary Examiner* — Michael A Faragalla

(57) ABSTRACT

A method of fabricating an optical element, comprises fabricating a three-dimensional mold having a relief pattern complementary to a pattern of the optical element to be fabricated, contacting the relief pattern with a solidifiable transmissive material, and solidifying the material thereby forming a transmissive substrate having the pattern thereupon. The method also comprises contacting the transmissive substrate with one or more substances wherein a difference in refractive indices between the substance(s) and the transmissive substrate is less than about 0.1.

14 Claims, 6 Drawing Sheets

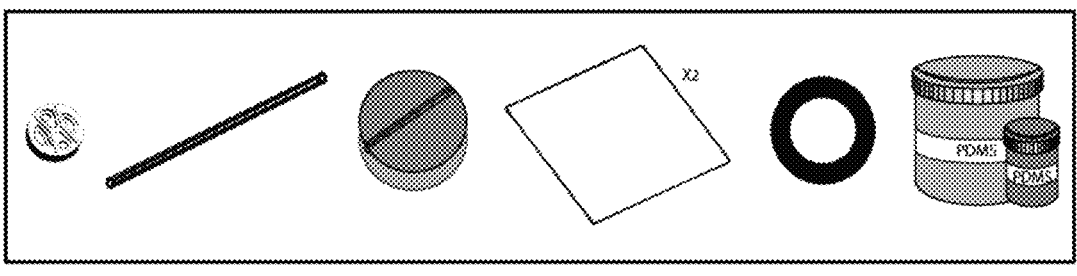
FIG. 7A
FIG. 7B                    FIG. 7C
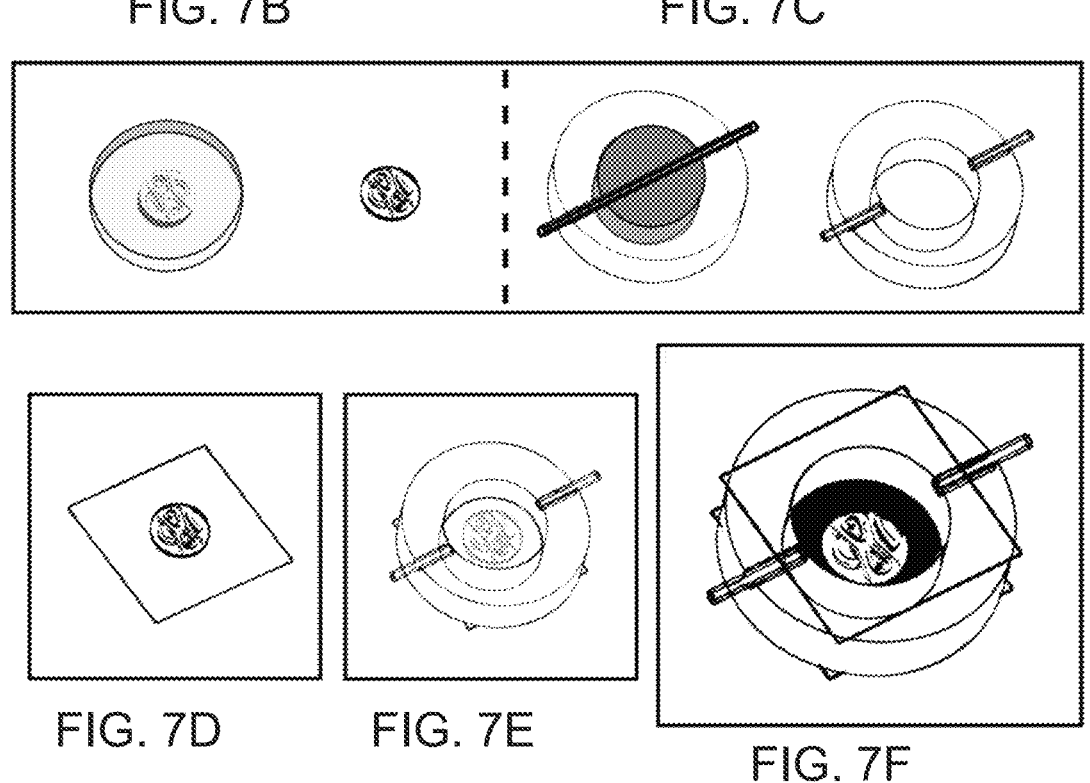
FIG. 7D          FIG. 7E
FIG. 7F

OPTICAL ELEMENT AND METHOD OF FABRICATING THE SAME

RELATED APPLICATION(S)

This application claims the benefit of priority under 35 USC § 119(e) of U.S. Provisional Patent Application No. 63/298,288 filed on Jan. 11, 2022, the contents of which are incorporated by reference as if fully set forth herein in their entirety.

FIELD AND BACKGROUND OF THE INVENTION

The present invention, in some embodiments thereof, relates to optics and, more particularly, but not exclusively, to an optical element and method of fabricating the same.

Diffractive optical elements (DOEs) are ubiquitous in optics, serving a variety of purposes in wavefront shaping. These elements typically consist of nanostructures in a transparent material. Relying on light diffraction, the DOEs alter the wavefront to obtain a desired intensity distribution in a specific plane, downstream the optical path. The flexibility in designing the DOEs enables the implementation of complicated optical functions in a single thin and light-weight optical element.

Background art includes U.S. Pat. No. 5,734,502, and U.S. Published Application Nos. 20070201011 and 20080204880.

SUMMARY OF THE INVENTION

According to some embodiments of the present invention there is provided a method of fabricating an optical element. For example, the method can be used for fabricating a diffractive optical element. The method comprises: fabricating a three-dimensional mold having a relief pattern complementary to a pattern (e.g., a diffractive pattern) of the optical element to be fabricated; contacting the relief pattern with a solidifiable transmissive material and solidifying the material thereby forming a transmissive substrate having the pattern thereupon; and contacting the transmissive substrate with one or more substances wherein a difference in refractive indices between the substance(s) and the transmissive substrate is less than about 0.1, more preferably less than about 0.05, more preferably less than about 0.025, more preferably less than about 0.002. In some embodiments of the present invention the mold is fabricated by three-dimensional printing.

According to some embodiments of the invention the substance is in liquid state and is non-solidifiable.

According to some embodiments of the invention the substance is in liquid state and is solidifiable.

According to some embodiments of the invention the method comprises receiving digital data describing an optical property selected from the group consisting of a nanometric pattern (e.g., a nanometric diffractive pattern), a phase pattern at a surface of the optical element, a far-field intensity pattern, and a far-field phase pattern, and converting the digital data to computer object data readable by a three-dimensional printing system.

According to an aspect of some embodiments of the present invention there is provided a method of fabricating an optical element, such as, but not limited to, a diffractive optical element. The method comprises: receiving digital data describing an optical property selected from the group consisting of a nanometric pattern (e.g., a nanometric diffractive pattern), a phase pattern at a surface of the optical element, a far-field intensity pattern, and a far-field phase pattern; converting the digital data to computer object data readable by a three-dimensional printing system; printing by the three-dimensional printing system a transmissive substrate having a pattern (e.g., a diffractive pattern) corresponding to the computer object data; and contacting the transmissive substrate by one or more substances to interface the pattern, wherein a difference in refractive indices between the substance and the transmissive substrate is less than about 0.1, more preferably less than about 0.05, more preferably less than about 0.025, more preferably less than about 0.002.

According to some embodiments of the invention the contact is established by three-dimensional printing.

According to some embodiments of the invention the contact is established by a technique other than three-dimensional printing.

According to some embodiments of the invention the conversion comprises upscaling the nanometric pattern along at least one direction, to provide an upscaled pattern.

According to some embodiments of the invention the convention comprises pixelating the upscaled pattern.

According to some embodiments of the invention at least one of the pattern (e.g., the diffractive pattern), the substance, and a material of the transmissive substrate is selected to induce or maintain chromatic aberration or dispersion on light beam passing through the optical element.

According to some embodiments of the invention the pattern (e.g., the diffractive pattern) comprises at least one feature, more preferably a plurality of features, which extends from a base surface of the transmissive substrate along a direction generally parallel to an optical axis of the optical element, and which has a size of at least about 100 microns or at least about 150 microns or at least about 200 microns or at least about 250 microns or at least about 300 microns or at least about 350 microns or at least about 400 microns or at least about 450 microns along the direction.

According to some embodiments of the invention the method comprises replacing the substance with replacement substance having optical properties which are different from optical properties of the substance, thereby tuning the optical element. The replacement substance and the substance may differ in at least one of: their refractive indices, their birefringence, and their transmissivity.

According to an aspect of some embodiments of the present invention there is provided optical element (e.g., a diffractive optical element), producible by the method as delineated above and optionally and preferably as further detailed below.

According to an aspect of some embodiments of the present invention there is provided an optical element such as, but not limited to, a diffractive optical element. The optical element comprises: a transmissive substrate formed with a pattern (e.g., a diffractive pattern) on a surface thereof; and one or more substances, interfacing the pattern; wherein a difference in refractive indices between the substance(s) and the transmissive substrate is less than about 0.1, more preferably less than about 0.05, more preferably less than about 0.025, more preferably less than about 0.002, and wherein the pattern is selected to induce or maintain chromatic aberration or dispersion on light beam passing through the optical element.

According to an aspect of some embodiments of the present invention there is provided an optical element (e.g., a diffractive optical element). The optical element comprises: a transmissive substrate formed with a pattern (e.g., a diffractive pattern) on a surface thereof, the pattern comprises at least one feature, more preferably a plurality of features, which extends from a base surface of the transmissive substrate along a direction generally parallel to an optical axis of the optical element, and which has a size of at least about 100 microns or at least about 150 microns or at least about 200 microns or at least about 250 microns or at least about 300 microns or at least about 350 microns or at least about 400 microns or at least about 450 microns along the direction. The optical element also comprises one or more substances, interfacing the pattern, wherein a difference in refractive indices between the substance(s) and the transmissive substrate is less than about 0.1, more preferably less than about 0.05, more preferably less than about 0.025, more preferably less than about 0.002.

According to some embodiments of the invention the substance is liquid.

According to some embodiments of the invention the substance is solid.

According to some embodiments of the invention the optical element is configured as a transmissive diffractive optical element.

According to some embodiments of the invention the optical element comprises a reflective surface and is configured as a reflective diffractive optical element.

According to an aspect of some embodiments of the present invention there is provided a light emitting system, which comprises the optical element as delineated above and optionally and preferably as further detailed below.

According to an aspect of some embodiments of the present invention there is provided an imaging system, which comprises the optical element as delineated above and optionally and preferably as further detailed below.

According to an aspect of some embodiments of the present invention there is provided an optical communication system, which comprises the optical element as delineated above and optionally and preferably as further detailed below.

According to an aspect of some embodiments of the present invention there is provided an optical spectrometer, which comprises the optical element as delineated above and optionally and preferably as further detailed below.

According to an aspect of some embodiments of the present invention there is provided a spectroscopy system, which comprises the optical element as delineated above and optionally and preferably as further detailed below.

According to an aspect of some embodiments of the present invention there is provided a lithography system, which comprises the optical element as delineated above and optionally and preferably as further detailed below.

According to an aspect of some embodiments of the present invention there is provided a holographic system, which comprises the optical element as delineated above and optionally and preferably as further detailed below.

According to an aspect of some embodiments of the present invention there is provided a system for determining compositional information of a structure, which comprises the optical element as delineated above and optionally and preferably as further detailed below.

According to an aspect of some embodiments of the present invention there is provided a solar power system, which comprises the optical element as delineated above and optionally and preferably as further detailed below.

According to an aspect of some embodiments of the present invention there is provided a computer software product, comprising a computer-readable medium in which program instructions are stored, which instructions, when read by a data processor, cause the data processor to receive an optical property selected from the group consisting of a nanometric pattern (e.g., a nanometric diffractive pattern), a phase pattern at a surface of the optical element, a far-field intensity pattern, and a far-field phase pattern, to converting the digital data to computer object data readable by a three-dimensional printing system, and to transmit the computer object data to a computer readable medium or to the three-dimensional printing system.

According to an aspect of some embodiments of the present invention there is provided an addon system for a three-dimensional printing system, the addon system comprises: a work surface; a transport mechanism configured for transporting an object printed by the three-dimensional printing system to the work surface, the object being a mold having a relief pattern complementary to a pattern (e.g., a diffractive pattern) of an optical element (e.g., a diffractive optical element); and a material delivery and solidification system configured to contact the relief pattern with a solidifiable transmissive material, to solidify the material thereby forming a transmissive substrate having the pattern thereupon, and to contact the transmissive substrate with at least one substance wherein a difference in refractive indices between the substance and the transmissive substrate is less than about 0.1, more preferably less than about 0.05, more preferably less than about 0.025, more preferably less than about 0.002.

According to an aspect of some embodiments of the present invention there is provided addon system for a three-dimensional printing system, the addon system comprises: a work surface; a transport mechanism configured for transporting an object printed by the three-dimensional printing system to the work surface, the object being a transmissive substrate having a pattern (e.g., a diffractive pattern) of an optical element (e.g., a diffractive optical element); and a material delivery system configured to contact the transmissive substrate with at least one substance wherein a difference in refractive indices between the substance and the transmissive substrate is less than about 0.1, more preferably less than about 0.05, more preferably less than about 0.025, more preferably less than about 0.002.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings:

FIGS. 7A-F are schematic illustrations of a fabrication process employed in experiments performed according to some embodiments of the present invention.

DESCRIPTION OF SPECIFIC EMBODIMENTS OF THE INVENTION

Figure 1:
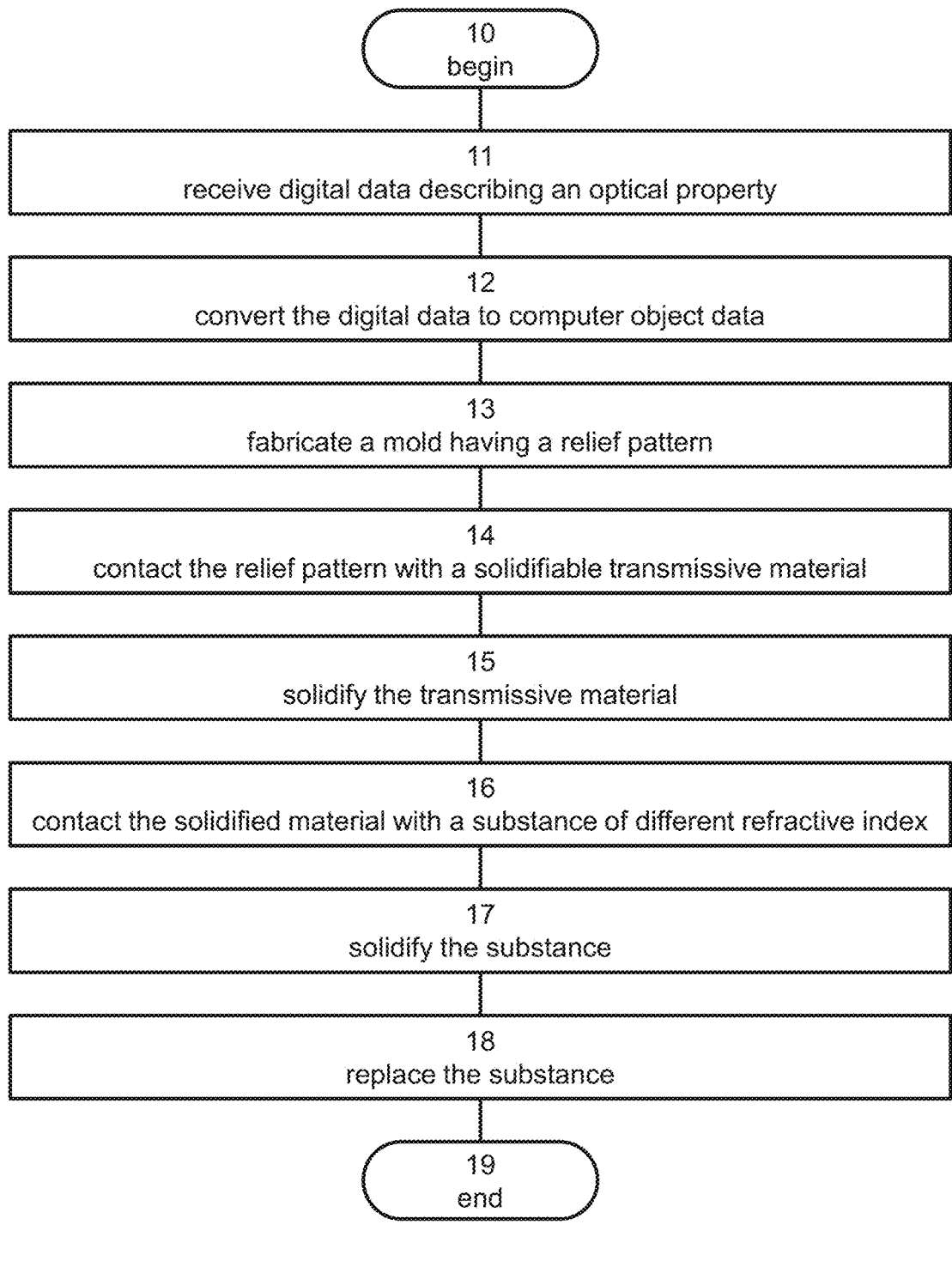
FIG. 1 is a flowchart diagram of a method suitable for fabricating an optical element according to various exemplary embodiments of the present invention.

The present invention, in some embodiments thereof, relates to optics and, more particularly, but not exclusively, to an optical element, such as, but not limited to, a diffractive optical element, and method of fabricating the same.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

FIG. 1 is a flowchart diagram of a method suitable for fabricating an optical element according to various exemplary embodiments of the present invention. In some embodiments of the present invention the optical element is a diffractive optical element It is to be understood that, unless otherwise defined, the operations described hereinbelow can be executed either contemporaneously or sequentially in many combinations or orders of execution. Specifically, the ordering of the flowchart diagrams is not to be considered as limiting. For example, two or more operations, appearing in the following description or in the flowchart diagrams in a particular order, can be executed in a different order (e.g., a reverse order) or substantially contemporaneously. Additionally, several operations described below are optional and may not be executed.

While the embodiments below are described with a particular emphasis to an optical element that is diffractive, it is to be understood that the method is suitable for fabricating also non-diffractive optical elements.

The method begins at 10 and optionally and preferably continues to 11 at which digital data describing an optical property is received. The received optical property can be a property of the optical element (e.g., diffractive optical element) to be fabricated or a property that the optical element imparts on an optical field interacting therewith. A representative example of a property of the optical element that can be received at 11 includes, without limitation, a nanometric pattern (e.g., nanometric diffractive pattern) on the surface of the element. Representative examples of optical properties that the diffractive optical element to be fabricated imparts on an optical field interacting therewith include, without limitation, a phase pattern at the surface of the diffractive optical element, a far-field intensity pattern, and a far-field phase pattern. The digital data can be received by means of a user interface or be read from a computer readable medium storing the data.

The method optionally and preferably continues to 12 at which the digital data received at 11 is converted to computer object data.

As used herein, "computer object data" refers to digital data that describe a shape of an object and that is readable by a three-dimensional printing system.

The computer object data generated at 12 can be in the form of graphic elements (e.g., a mesh of polygons, non-uniform rational basis splines, etc.) defining a surface that is complementary to the surface of the diffractive optical element to be fabricated. A computer in communication with the three-dimensional printing system reads the graphic elements and applies slicing software that transforms the graphic elements to a grid of pixels that define a shape of mold to be used for fabricating the diffractive optical element. The pixels are arranged as a plurality of slices, each comprising a plurality of pixels describing a layer of the mold. Alternatively, the computer object data generated at 12 can already be pixelized and arranged in slices. In these embodiments, operation 12 includes converting the digital data received at 11 directly into a grid of pixels defining the shape of the mold and being arranged as a plurality of slices, where each slice comprises a plurality of pixels describing a layer of the mold.

The computer object data generated at 12 can be in any format suitable for three-dimensional, including, without limitation, a Standard Tessellation Language (STL), a StereoLithography Contour (SLC) format or the like.

The conversion process applied at 12 depends on the property that the data received at 11 describes. When the data received at 11 describes a nanometric diffractive pattern on the surface of the element, the conversion can include transforming the diffractive pattern into a height map of the surface of the mold, wherein the feature sizes of the height map are upscaled relative to the nanometric diffractive pattern. Preferably, the feature sizes are upscaled by at least one or at least two or at least three orders of magnitude. For example, the height map can include features having heights of at least about 100 microns or about 200 microns, where the height is defined along a direction parallel to the optical axis of the diffractive optical element. Once the height map is obtained the computer object data can be generated based on the height map. When the data received at 11 describes a property that the diffractive optical element imparts on an optical field interacting therewith, the conversion can include back solving equations governing the optical property to obtain a nanometric diffractive pattern on the surface of the element, transforming the diffractive pattern into an upscaled height map of the mold's surface and generating the computer object data based on the height map.

In some embodiments of the present invention the computer object data are received from an external source (e.g., a computer readable medium, a cloud storage facility or the like), in which case operations 11 and 12 can be skipped.

The method continues to 13 at which a three-dimensional mold is fabricated. The mold is preferably printed by three-dimensional printing, but may also be fabricated by other techniques, such as, but not limited to, machining, molding, lithography, and the like.

Three-dimensional printing is a process in which the mold is fabricated layer-by-layer where each layer contains building material at selected locations based on computer object data that describe slices of the mold to be fabricated (e.g., the data obtained at 12). Each layer is formed by the three-dimensional printing system that scans a two-dimensional surface and patterns it with the building material. While scanning, the printing system visits a plurality of target locations on the surface or a previously formed two-dimensional layer, and decides, for each target location, whether or not the target location is to be occupied by the material, where the decision is made according to the computer object data. The printed mold has a relief pattern which is complementary to a diffractive pattern of the diffractive optical element to be fabricated.

The mold can be printed by any printing technology, including, without limitation, inkjet printing, stereolithography, electron beam melting, selective laser sintering, laminated object manufacturing, fused deposition modeling and the like.

The method proceeds to 14 at which the relief pattern of the mold is contacted with a solidifiable transmissive material, and to 15 at which the material is solidified to thereby form a transmissive substrate having the diffractive pattern thereupon.

The solidifiable transmissive material can be of any type known in the art of diffractive optics. For example, the solidifiable transmissive material can be a silica-based material, such as, but not limited to, fused silica, fused spherical silica, and crystalline silica. Also contemplated are inorganic oxide materials, glasses, quartz, silicon, gallium phosphide, and transmissive polymeric materials, such as, but not limited to, methacrylate polymers, e.g., PMMA, polycarbonates, cyclic olefin polymers, sytrenic polymers, fluorine-containing polymers, polyesters, polyetherketones, polyethersulfones, polyimides or mixtures thereof.

The solidification 15 can be by any technique known in the art, depending on the type of solidifiable transmissive material used in 14. Generally, the solidification can be chemical, thermal, or radiative.

In various exemplary embodiments of the invention the method proceeds to 16 at which the solidified transmissive substrate is contacted with one or more substance having a refractive index different from the refractive index of the solidified transmissive material. Preferably, the difference in refractive indices between the substance and the solidified transmissive material is less than about 0.1, more preferably less than about 0.05, more preferably less than about 0.025, more preferably less than about 0.002.

The Inventors appreciate that conventional techniques for the fabrication of diffractive optical elements have limited flexibility in the design of the 3D profile of the elements. The Inventors found that concatenation of materials with different refractive indices can produce a high-quality diffractive optical element with feature sizes orders of magnitude larger than the traditional nanoscale. The Inventors found that this significantly simplifies the production of the diffractive optical element and also reduces the manufacturing costs.

In some embodiments of the present invention the substance used at 16 is in liquid state and is non-solidifiable. In these embodiments, the solidified transmissive material is placed in an enclosure configured to receive the liquid. A representative example of such a container is shown in FIGS. 7B-F described in the Examples section that follows. Alternatively, the substance can be in liquid state and solidifiable, in which case the method proceeds to 17 at which the substance is solidified.

Once fabricated, the diffractive optical element can be employed in a system that uses diffractive optics. Representative uses of such systems include, without limitation, a light emitting system, an imaging system, an optical communication system, an optical spectrometer, a spectroscopy system, a lithography system, a holographic system, a system for determining compositional information of a structure, a solar power system, and the like. The diffractive pattern, the substance, and/or the transmissive material is selected based on the application for which the diffractive optical element is designed. In some embodiments of the present invention at least one of the diffractive pattern, the substance, and the transmissive material is selected to induce or maintain chromatic aberration or dispersion on light beam passing through the diffractive optical element.

In some embodiments of the present invention the substance is replaced 18 with a replacement substance having optical properties which are different from the optical properties of the previous substance. These embodiments are useful when it is desired to tune the diffractive optical element, for example, according to a preselected optical phase to be imparted by the diffractive optical element on an optical field interacting therewith. The replacement substance and the substance may differ in at least one of: their refractive indices, their, birefringence, and their transmissivity.

The method ends at 19.

Figure 2:
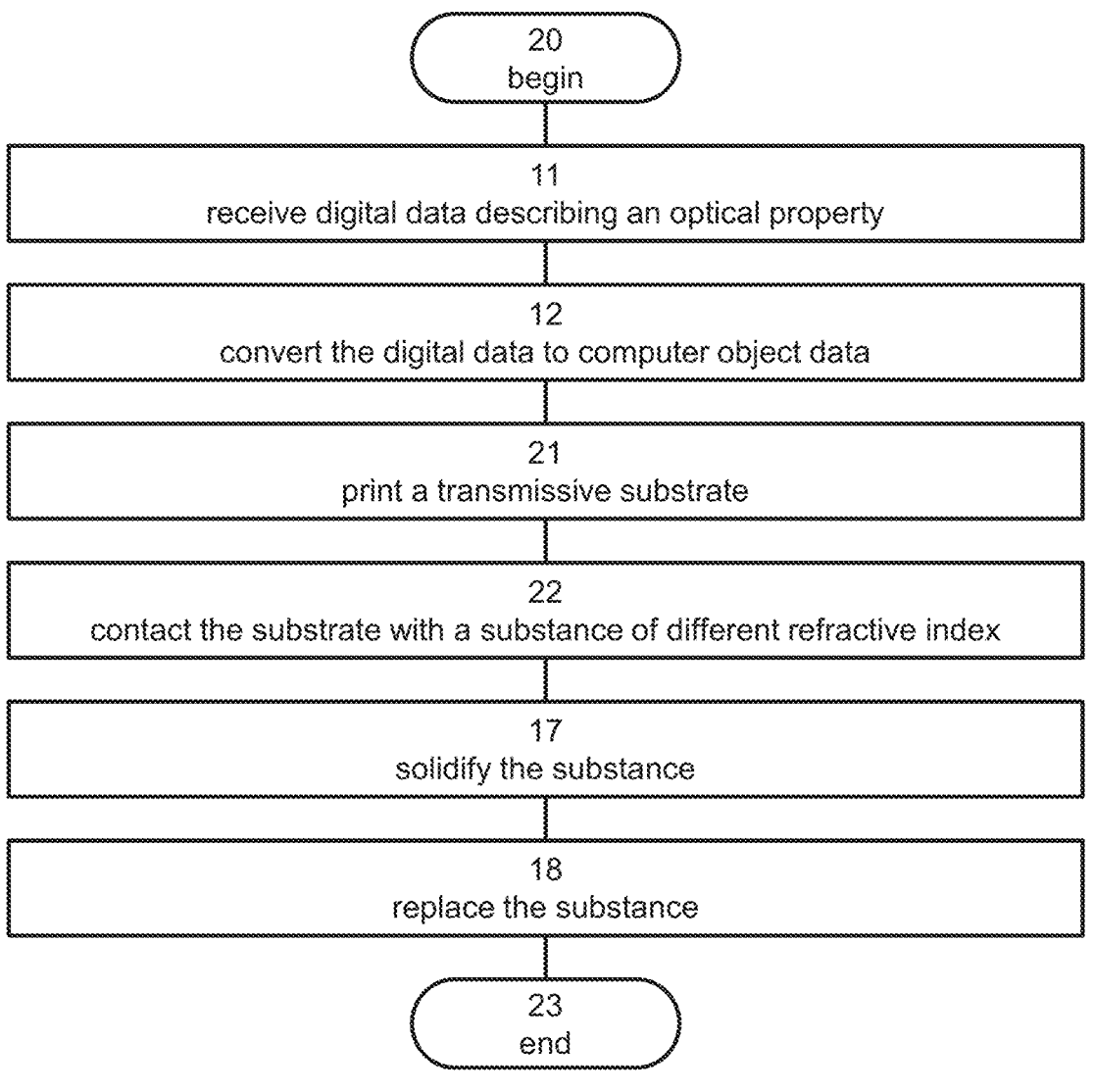
FIG. 2 is a flowchart diagram of another method suitable for fabricating an optical element according to various exemplary embodiments of the present invention.

FIG. 2 is a flowchart diagram of another method suitable for fabricating a diffractive optical element according to exemplary embodiments of the present invention.

The method begins at 20 and continues to 11 at which receiving digital data describing an optical property is received, and to 12 at which the digital data is converted to computer object data. Operations 11 and 12 can be executed as described above with respect to method 10, except that in method 20 the generated object data define the surface of the diffractive optical element itself rather than the complementary surface. The method continues to 21 at which a transmissive substrate having a diffractive pattern corresponding to the generated computer object data is printed by three-dimensional printing. Operation 21 can employ any three-dimensional printing technique, such as, but not limited to, the techniques described above with respect to operation 13 of method 10.

The method continues to 22 at which the transmissive substrate is contacted by one or more substances to interface the diffractive pattern. The substance has a refractive index that is different from the refractive index of the transmissive substrate. Preferably, the difference in refractive indices between the substance and the substrate is less than about 0.1, more preferably less than about 0.05, more preferably less than about 0.025, more preferably less than about 0.002. Operation 22 can be executed by three-dimensional printing, or by a technique other than three-dimensional printing. When three-dimensional printing is employed, the substance is preferably in liquid state and is solidifiable. When a technique other than three-dimensional printing, the substance can be in liquid state or solid state. When the substance is in liquid state and is solidifiable, the method proceeds to 17 at which the substance is solidified.

In some embodiments of the present invention the method continues to 18 at which the substance is replaced 18 with a replacement substance as further detailed hereinabove.

The method ends at 23.

Figure 3:
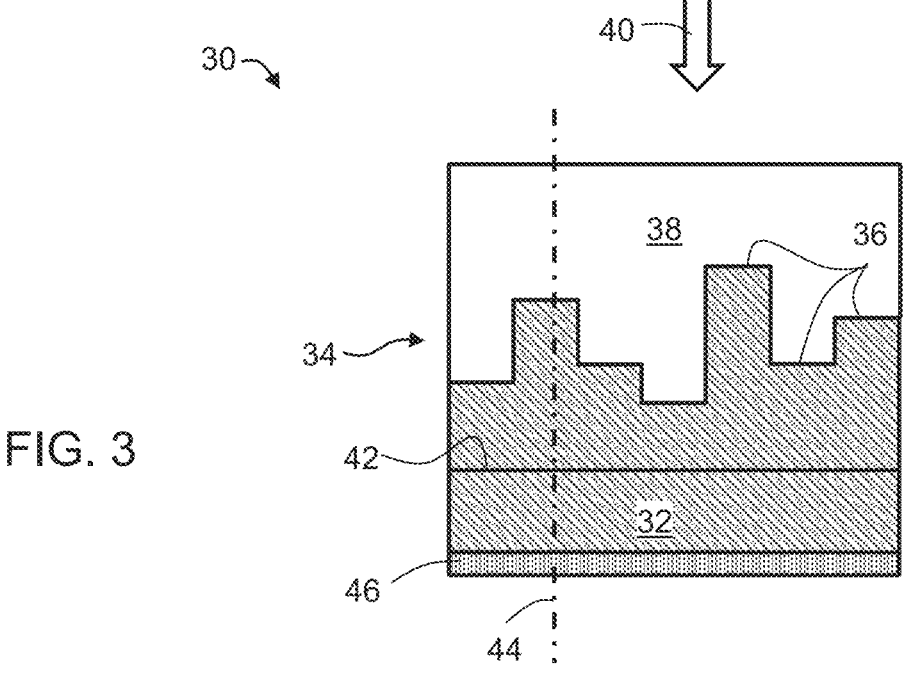
FIG. 3 is a schematic illustration of an optical element, according to some embodiments of the present invention.

FIG. 3 is a schematic illustration of a diffractive optical element 30, according to some embodiments of the present invention. Diffractive optical element 30 can be fabricated by method 10 or method 20, or by any other method. Element 30 comprises a transmissive substrate 32 formed with a diffractive pattern 34 on a base surface 42 of substrate 32. Element 30 also comprises one or more substances 38 that interfaces diffractive pattern 34. The diffractive pattern 34 is optionally and preferably selected to induce or maintain chromatic aberration or dispersion on light beam 40 interacting with element 30. Substance 38 and substrate 32 have different refractive indices. Preferably, the difference in refractive indices between substance 38 and substrate 32 is less than about 0.1, more preferably less than about 0.05, more preferably less than about 0.025, more preferably less than about 0.002. In some embodiments of the present invention substance 38 is liquid, and in some embodiments of the present invention substance 38 is solid.

Diffractive pattern 34 comprises features 36 extending from base surface 42 of substrate 32 along a direction generally parallel to an optical axis 44 of element 30. In some embodiments of the present invention the size along axis 44 of one or more, preferable each, of features 36 is at least about 100 microns.

Diffractive optical element 30 can be configured as a transmissive diffractive optical element, or a reflective diffractive optical element. When element 30 is reflective, it preferably comprises a reflective surface 46. Reflective surface 46 can be placed adjacent to substrate 32 (e.g., attached thereto), as illustrated in FIG. 3, or adjacent to substance 38.

Figure 4:
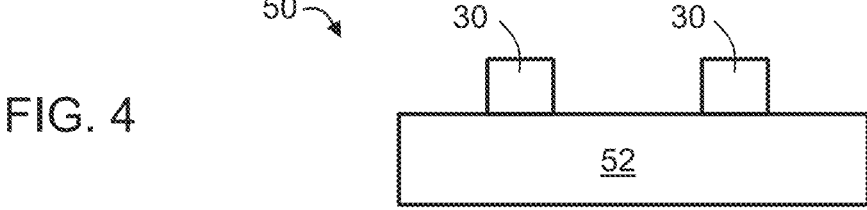
FIG. 4 is a schematic illustration of an optical system employing the optical element, according to some embodiments of the present invention.

FIG. 4 is a schematic illustration of an optical system 50, according to some embodiments of the present invention. Optical system 50 comprises an active region 52 and one or more diffractive optical elements, such as, but not limited to, element 30. Optical system 50 can be any optical system that uses diffractive optics. Representative uses of such systems include, without limitation, a light emitting system, an imaging system, an optical communication system, an optical spectrometer, a spectroscopy system, a lithography system, a holographic system, a system for determining compositional information of a structure, a solar power system, and the like. The type of active region 52 depends on the type of system 50. For example, when system 50 is configured to emit light, region 52 can be a light emitting region (e.g., a p-n junction or the like), and when systems configured to receive light, region 52 can be a light sensor or an imager.

Figure 5A:
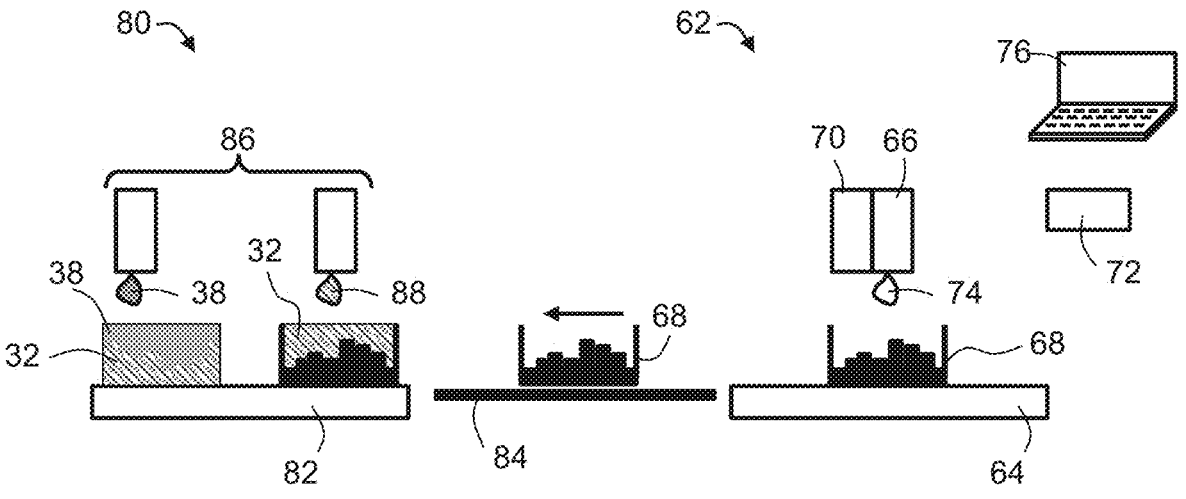
FIGS. 5A and 5B are schematic illustrations of an addon system for a three-dimensional printing system, according to some embodiments of the present invention.
Figure 5B:
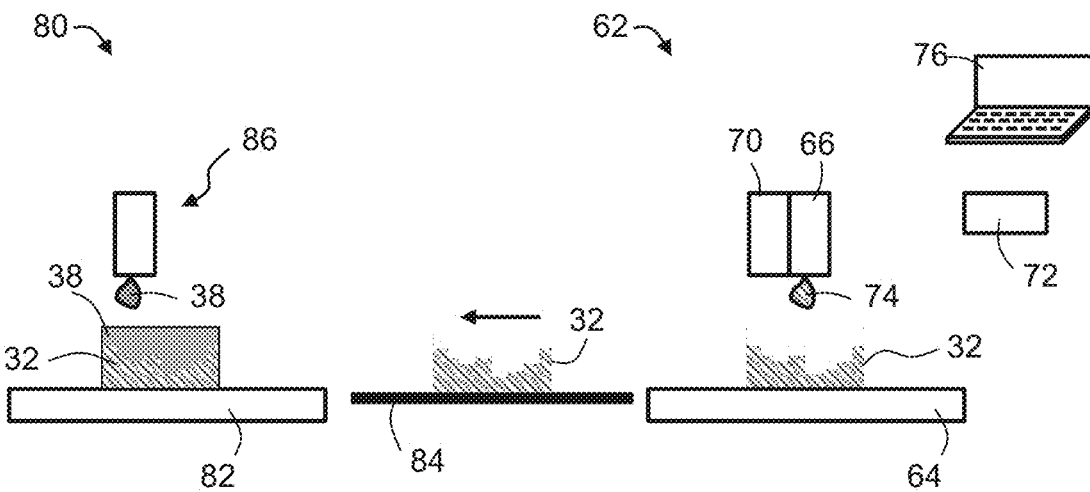

FIGS. 5A-B are schematic illustrations of an addon system 80 for a three-dimensional printing system 62, according to some embodiments of the present invention. Printing system 62 typically comprises a tray 64 and a printing head 66 configured to deposit building material 74 on tray 64 in layers to form an object 68 thereon. Head 66 can be of any type known in the art, such as, but not limited to, an inkjet printing head, an extruder, or the like. In some embodiments of the present invention system 62 also comprises a radiation source 70 which irradiates the building material, once deposited and solidifies it. In some embodiments of the present invention, system 62 is a stereolithography system, in which case head 66 comprises a scanning laser source that does not deposit building material, as known in the art of three-dimensional printing.

Head 66 is typically configured to move parallel to the surface of tray 64, and tray 64 is typically configured to move vertically, so as to vary the distance between tray 64 and head 66. However, this need not necessarily be the case, since, the present embodiments contemplate any type of relative motion between head 66 and tray 64. The motion of head 66 and tray 64, as well as the operation of head 66 and source 70 (when employed), are controlled by a three-dimensional printing controller 72, based on computer object data that describe the shape of object 68. Controller 72 is in communication with a computer 76 that transmits the computer object data to controller 72. In some embodiments of the present invention computer 76 receives digital data describing an optical property and converts the digital data into computer object data, as further detailed hereinabove.

Addon system 80 comprises a work surface 82 and a transport mechanism 84 configured for transporting object 68, once printed by printing system 62, to work surface 82. Transport mechanism 84 can be of any type known in the art. Representative examples of types of transport mechanisms suitable for the present embodiments include, without limitation, a conveyor and a robotic arm.

In the configuration shown in FIG. 5A, object 68 is a mold having a relief pattern complementary to a diffractive pattern of a diffractive optical element, e.g., complementary to pattern 34, and the computer object data describe the diffractive pattern of substrate 32, and the computer object data describe the relief pattern of the mold. In these embodiments, system 80 comprises a material delivery and solidification system 86 configured to contact the relief pattern of the mold with a solidifiable transmissive material 88, and to solidify the material 88 to form transmissive substrate 32 having the diffractive pattern thereupon. System 86 is also configured to contact transmissive substrate 32 with one or more substances 38 having a refractive index that is different from the refractive index of substance 32 as further detailed hereinabove.

In the configuration shown in FIG. 5B, the object printed by system 62 is transmissive substrate 32 itself, and so material 74 is a solidifiable material that forms transmissive substrate 32 once solidified, and the computer object data describe the diffractive pattern of substrate 32. In system 80 comprises a material delivery system 86 configured to contact transmissive substrate 32 with one or more substances 38 having a refractive index that is different from the refractive index of substance 32 as further detailed herein-above.

In any of the above embodiments, substance 38 can be solidifiable, and system 86 is optionally also configured to solidify substance 38, by applying heat, radiation, or chemical agent thereto.

As used herein the term "about" refers to ±10%.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Various embodiments and aspects of the present invention as delineated hereinabove and as claimed in the claims section below find experimental support in the following examples.

EXAMPLES

Reference is now made to the following examples, which together with the above descriptions illustrate some embodiments of the invention in a non limiting fashion.

The Inventors appreciate that conventional techniques for the fabrication of DOE have limited flexibility in the design of the 3D profile of the DOE. This is particularly problematic when designing a chromatically-dependent DOE. The main existing DOE fabrication methods are photolithography, and direct machining. In photolithography, for example, the error is proportional to the etching depth in the material, therefore the obtainable profile is limited. In direct machining the profile is typically limited by the resolution of the cutting edge. The Inventors have also realized that the aforementioned methods are expensive, and typically require specialized facilities such as a clean-room environment.

In a search for an improved technique for fabrication a DOE, the Inventors realized that one or the challenges associated with DOE fabrication comes from the requirement to achieve nanoscale-precision. This limits the fabrication methods which can be used to fabricate them, to highly-precise, expensive and cumbersome fabrication methods.

The Inventors found that concatenation of materials with different refractive indices can produce a high-quality DOE with feature sizes orders of magnitude larger than the traditional nanoscale. The Inventors found that this significantly simplifies the production of the DOE and also reduces the manufacturing costs. The Inventors found that by increasing the feature sizes, the DOE can be produced, at least in part, using additive manufacturing, such as, but not limited to, 3D printing, e.g., 3D inkjet printing. The advantage of using additive manufacturing is that it provides large flexibility in design.

Figures 6A, 6B:
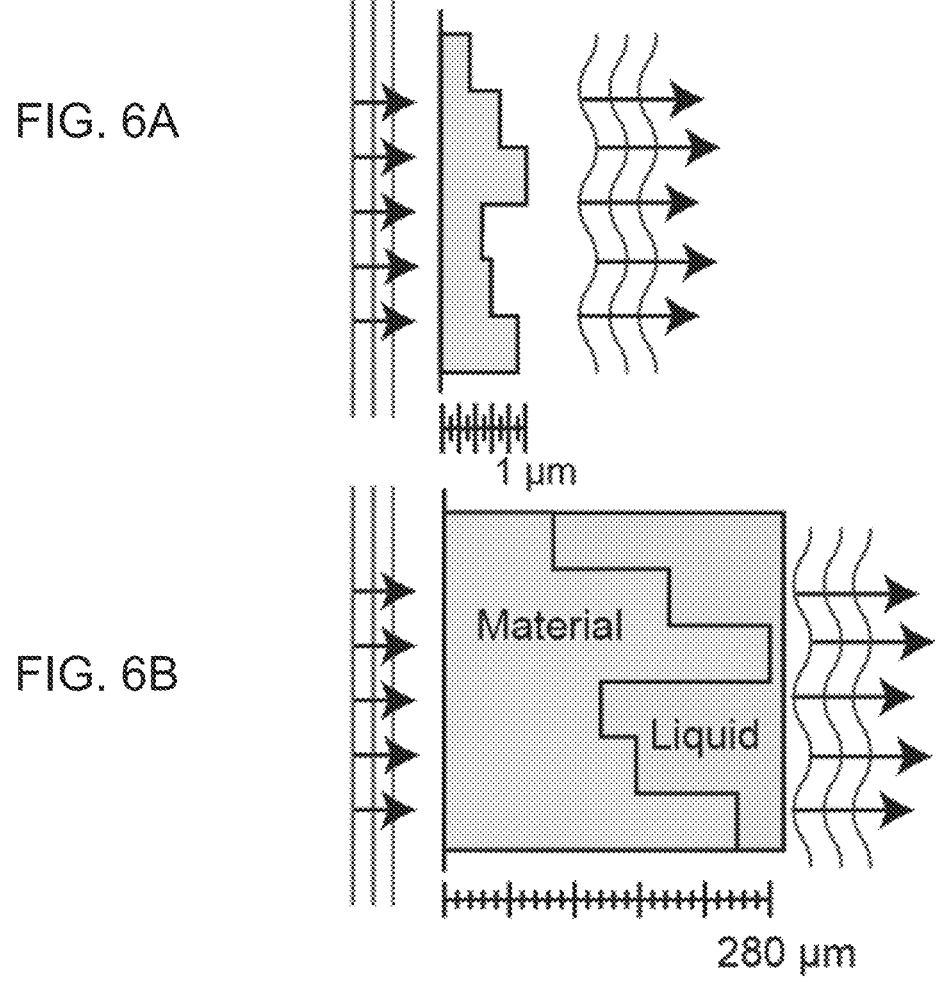
FIGS. 6A and 6B are schematic illustrations of a diffractive optical element that does not include an interfacing substance and therefore has sub-micrometric feature sizes (FIG. 6A), and a diffractive optical element that comprises an interfacing substance and can therefore have larger feature sizes (FIG. 6B)

In some embodiments of the present invention a dielectric element is immersed in a nearly-index matched medium, such that accumulating the desired phase-delay difference incurred by passing through device requires propagating through proportionally more material (FIGS. 6A and 6B, where FIG. 6A illustrates a DOE without concatenation of materials and FIG. 6B illustrates a DOE with concatenation of materials). Moreover, the use of two different materials with different properties, for example, different dispersion and refractive indices, can allow fabrication of an efficient and sensitive chromatically dependent DOE, namely, intentionally imposing a different response of the DOE to different wavelengths.

The relation between optical phase accumulated to element thickness can be described as follows:

$$\Delta\phi = \frac{2\pi h}{\lambda}(n_{DOE} - n_{media}), \tag{1}$$

where $\Delta\phi$ is the accumulated phase difference between light traversing the DOE compared to the surrounding media; $\lambda$ is the wavelength; h is the height of the DOE; and n refers to the refractive index of the DOE and surrounding media, respectively.

Typically, the DOE is made of high-quality optical material, e.g. Fused silica, and $n_{DoE} \approx 1.45$. Conventionally, the surrounding medium is air and so $n_{media} \approx 1$. On the other hand, in the immersed device of the present embodiments, air is replaced by substance (liquid or solid), which decreases the refractive index difference by orders of magnitude to be $n_{DOE} - n_{media} < 0.1$, or $n_{DOE} - n_{media} < 0.05$, or $n_{DOE} - n_{media} < 0.01$, for example, about 0.002. This means that if the DOE is immersed in such a substance, h can be increased significantly to maintain the same phase accumulation as in air. In other words, the axial size of the DOE scales up by orders of magnitude.

The decrease in refractive index difference not only increases the required height of the DOE. This also scales the tolerable height error, due to imperfection in fabrication. The effects of the index and height errors on the accumulated phase error can be described by:

$$\delta\Delta\phi_{Error} = \Delta\phi_{actual} - \Delta\phi_{target} = \tag{2}$$

$$\frac{2\pi}{\lambda}(\Delta n + \delta n)\cdot(h + \delta h) - \frac{2\pi}{\lambda}\cdot\Delta n\cdot h \xrightarrow{\delta n,\delta h \ll \Delta n,\Delta h} \Delta n\cdot\delta h + h\cdot\delta n,$$

where $\delta\Delta\phi_{Error}$ is the unintended accumulated phase difference between light traversing the DOE compared to the surrounding media; $\lambda$ is the wavelength; $\delta h$ is the height error from fabrication of the DOE; and $\delta n$ refers to the error in refractive index difference between the DOE and surrounding media. From the relation in equation (2), it is concluded that as the refractive index difference decreases, the effect of the fabrication error is similarly reduced. This allows low precision 3D printing fabrication methods, and guarantees similar relative phase error as conventional lithography dielectric DOE.

The DOE of the present embodiments can be used in any application which requires diffractive optics, for either emitting or receiving an optical field. Representative of applications in which the DOE of the present embodiments can be used include, without limitation, laser processing, lithography and holographic lighting, computational imaging, photonic structures, solar power, communication, optical information processing, Bragg grating fabrication, and more.

According to some embodiments of the present invention the data describing the nano-design of the DOE is converted to computer object data allowing the use of additive manufacturing. In some embodiments of the present invention this conversion includes one or more of the following the operations.

1. Scaling up the dimension of the DOE in the direction of light propagation from tens of nanometers to tens of micrometers. Since there is typically a trade-off between the precision and similarity between the materials' refractive indices, and the tolerable fabrication error, the scaling is optionally and preferably executed separately for different DOEs, according to the respective materials and the desired printing precision.

2. Fitting the scaled up data to the specification of the additive manufacturing system, particularly pixel size, smoothness, and surface roughness.

3. In some embodiments, the printed part can be used as a mold which is thereafter casted with homogeneous material to create a transmissive substrate forming a first part of the DOE. The substance can then be casted on the top of the transmissive substrate.

4. The design can optionally and preferably be adapted to effect chromatic dependence for affecting differently different wavelengths.

Alternatively, instead of converting a nanometric diffractive pattern, the method can operate directly on digital data describing a desired phase pattern at a surface of the diffractive optical element. In this case, the method converts these digital data to computer object data adapted to the specification of the additive manufacturing system, particularly pixel size, smoothness, and surface roughness, for allowing the manufacturing system fabricating a micrometric diffractive pattern or a micrometric pattern that is complementary to the diffractive pattern.

Still alternatively, the method can receive digital data describing a desired far-field intensity pattern or a desired far-field phase pattern. In this case, the method executes a phase-retrieval procedure for determining a corresponding phase pattern at a surface of the diffractive optical element, and then converts this determined phase pattern to computer object data adapted to the specification of the additive manufacturing system.

In any of the above embodiments, the conversion can be provided as a computer software product to be used as an add-on for an additive manufacturing system. This allows the same additive manufacturing system to be used both for fabricating non-optical parts and, with the aid of the add-on, for fabricating a DOE according to some embodiments of the present invention.

Also contemplated are embodiments in which add-on controllable hardware is combined with the additive manufacturing system for casting the substance above the transmissive substrate.

Liquid Immersed DOE

Following is a description of an experiment, preformed according to some embodiments of the present invention for fabricating a DOE. This exemplified experiment is not to be considered as limiting.

FIGS. 7A-F are schematic illustration of liquid immersed DOE fabrication. FIG. 7A illustrates the components used in this experiment, left to right: a 3D printed reversed template, a tube (inside diameter about 1 mm), metal disk with slot that matches the outer diameter of the tube, two Fused silica wafers (or other high optical quality wafers), metal ring matched to the diameter of the DOE and PDMS. FIGS. 7B and 7C illustrate a preparation operation: polymerization of the PDMS on the DOE template (tubes and metal ring with the slot) and the extracted PDMS DOE (PDMS frame). FIG. 7D illustrates an operation in which the PDMS DOE is attached to the fused silica wafer. FIG. 7E illustrates an operation in which the PDMS frame is attached to the fused silica wafer. FIG. 7F illustrates an operation in which the second fused silica wafer is attached to the exposed side of the PDMS and the blocking metal ring is glued with UV adhesive.

A ceramic mold containing the complementary pattern of the DOE was printed via additive manufacturing. The diffractive features were up to 270 µm along the optical axis of the DOE, and the working resolution of the additive manufacturing was of a few microns. The mold was then covered with a thin layer of oil (WD40) and a transparent PDMS layer, which was used as the transmissive substrate of the DOE (FIG. 7B). The PDMS frame was polymerized while having therein two small tubes (internal diameter 1 mm, external diameter 2 mm), and a metal disk with a slot to keep an empty volume for containing the liquid (FIG. 7C). After extracting the PDMS transmissive substrate from the mold it was attached to a fused silica wafer, to serve as an optical window (FIG. 7D). The PDMS frame was then attached to the fused silica wafer at the periphery of the pattern (FIG. 7E). A second fused silica wafer was then attached to the exposed side of the PDMS frame to close the chamber from above. A blocking metal ring, with an inside diameter matching the PDMS substrate was glued to the external side of the fused silica wafer for blocking light outside the PDMS substrate (FIG. 7F).

All the attachments between PDMS and fused silica were done by plasma treatment. The tubes were placed in the PDMS frame to allow easy liquid exchange for liquid calibration. The desired refractive index of the liquid was calibrated by iterative process in which different concentrations of glycerol and water were injected to the chamber and the optical performants of the DOE were examined. After each iteration, the correction for the concentration was estimated by comparing between simulation and experimental data. Before injecting the glycerol-water solution into the chamber, isopropanol was injected to minimize bubbles. The whole chamber, having a thickness of 9 mm was placed in optical system.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of fabricating a diffractive optical element, comprising:

receiving digital data describing an optical property selected from the group consisting of a nanometric pattern, a phase pattern at a surface of the optical element, a far-field intensity pattern, and a far-field phase pattern;

converting said digital data to computer object data readable by a three-dimensional printing system;

fabricating, by said three-dimensional printing system and according to said computer object data, a three-dimensional mold having a relief pattern complementary to a pattern of the optical element to be fabricated;

contacting said relief pattern with a solidifiable transmissive material, and solidifying said material thereby forming a transmissive substrate having said pattern thereupon; and contacting said transmissive substrate with at least one substance wherein a difference in refractive indices between said substance and said transmissive substrate is less than 0.1±10%.

2. The method according to claim 1, wherein said substance is in liquid state and is non-solidifiable.

3. The method according to claim 1, wherein said substance is in liquid state and is solidifiable.

4. The method according to claim 1, wherein at least one of said pattern, said substance, and a material of said transmissive substrate is selected to induce or maintain chromatic aberration or dispersion on light beam passing through the optical element.

5. The method according to claim 1, wherein said pattern comprises at least one feature which extends from a base surface of said transmissive substrate along a direction generally parallel to an optical axis of the optical element, and which has a size of at least 100±10% microns along said direction.

6. The method according to claim 1, comprising replacing said substance with replacement substance having optical properties which are different from optical properties of said substance, thereby tuning the optical element.

7. An optical element, producible by the method according to claim 1.

8. A method of fabricating a diffractive optical element, comprising:

receiving digital data describing an optical property selected from the group consisting of a nanometric pattern, a phase pattern at a surface of the optical element, a far-field intensity pattern, and a far-field phase pattern;

converting said digital data to computer object data readable by a three-dimensional printing system; and printing by said three-dimensional printing system a transmissive substrate having a pattern corresponding to said computer object data; and contacting said transmissive substrate by at least one substance to interface said pattern, wherein a difference in refractive indices between said substance and said transmissive substrate is less than 0.1±10%.

9. The method according to claim 8, wherein said contacting is by three-dimensional printing.

10. The method according to claim 8, wherein said contacting is by a technique other than three-dimensional printing.

11. The method according to claim 1, wherein said converting comprises upscaling said nanometric pattern along at least one direction, to provide an upscaled pattern.

12. The method according to claim 11, wherein said converting comprises pixelating said upscaled pattern.

13. An optical element, producible by the method according to claim 8.

14. The method according to claim 1, wherein said converting comprises upscaling said nanometric pattern along at least one direction, to provide an upscaled pattern.

*    *    *    *    *